May 2, 1950 R. F. WILD 2,506,006
ELECTRICAL MEASURING AND CONTROLLING APPARATUS
Filed June 21, 1946 2 Sheets-Sheet 1

*INVENTOR.*
RUDOLF F. WILD
BY Arthur H. Swanson
ATTORNEY.

May 2, 1950 R. F. WILD 2,506,006
ELECTRICAL MEASURING AND CONTROLLING APPARATUS
Filed June 21, 1946 2 Sheets-Sheet 2

*INVENTOR.*
RUDOLF F. WILD
BY *Arthur H. Swanson*
ATTORNEY.

Patented May 2, 1950

2,506,006

UNITED STATES PATENT OFFICE 2,506,006

ELECTRICAL MEASURING AND CONTROLLING APPARATUS

Rudolf F. Wild, Philadelphia, Pa., assignor, by mesne assignments, to Minneapolis-Honeywell Regulator Company, Minneapolis, Minn., a corporation of Delaware Application June 21, 1946, Serial No. 678,256

31 Claims. (Cl. 318—28)

The present invention relates to self-balancing measuring and control apparatus of the type comprising a normally balanced circuit network which is unbalanced by changes in the quantity measured and which is rebalanced by a reversible electric motor, which also comprises electronic amplifying means through which said motor is controlled. Said amplifying means is of a known type operating to amplify a 60 cycle or other relatively low frequency alternating current which is in predetermined proportion to the extent of network unbalance, and the amplifying means controls the operation of the rebalancing motor in selective accordance with the phase and amplitude of said current of relatively low frequency.

The general object of the present invention is to combine measuring and control apparatus of the above mentioned type with means for utilizing the electronic amplifying means of such apparatus in creating a high frequency oscillating current signal which will appear in and disappear from the output circuit of the amplifier on predetermined variations in the operation of the apparatus.

The invention is characterized by the fact that the relatively high frequency alternating current or signal is superimposed on the said relatively low frequency current undergoing amplification, and by the fact that said relatively low frequency current is so proportioned that said high frequency signal will be cut off or clipped in the amplifier or be carried into the output circuit, depending on variations in particular conditions of operation of the apparatus indicated by the appearance or non-appearance of the high frequency signal in the output circuit.

In one use of the present invention, the high frequency signal is employed in detecting and minimizing the injurious consequences of apparatus failures. In such "safe failure" use of the invention, the magnitudes of the low frequency carrying current and high frequency signal are so proportioned that in normal operation the high frequency signal will be continuously apparent in the output circuit, but will disappear from that circuit as a result of any failure in operation which increases the magnitude of the low frequency carrying current above its maximum normal operation value.

In other uses of the invention, the relative magnitudes of the low frequency current and high frequency signal current are such that the high frequency signal will be detectable in the output circuit only when the measuring circuit is in or near balance, and its appearance is utilized in effecting operations which become appropriate when balance is attained or closely approached.

Thus one specific object of the present invention is to provide means for utilizing the high frequency signal as the network is brought back into balance, after being unbalanced, to subject the rebalancing motor to a damping or braking action, so as to reduce the risk of over-travel of the motor. The means which I have devised for utilizing the high frequency current in damping the rebalancing motor is especially advantageous because it may be used to check the operation of the motor prior to the attainment of complete balance, and after the motor operation is thus checked, the damping action may be quickly eliminated, so that the apparatus then has full sensitivity to respond to a new unbalancing action which may then occur, and if no such action then occurs the motor may then complete the rebalancing adjustment and avoid the creation of a significant dead zone or spot.

In another use of the present invention, the high frequency signal is employed to initiate the recording operation in a multiple measuring and recording instrument, thus providing so-called balance printing, as distinguished from cyclic printing. With balance printing, a record is selectively made of each of the variables being measured as soon as the instrument is balanced, while with cyclic printing a record of each of the measured variables is made only at regular, fixed intervals of time, the length of which intervals is determined by the characteristics of the instrument.

In cyclic printing, so that false points will not be recorded which will result if printing occurs while the instrument is not in balance, the printing cycle must be sufficiently long to permit the print wheel carriage to travel completely across scale between the printing of points on two consecutive records. This condition is necessary to permit accurate recording of two variables which may be widely spaced, or in an extreme case, where the record of one variable may be at the low end of the scale while the record of the next variable to be recorded is at the high end of the scale.

It will be noted that this requirement of cyclic printing unnecessarily lengthens the interval between the printing of consecutive records which may be reasonably close together and only require a fraction of the total printing cycle for the instrument to reach a new balanced condition. This consideration is important in those applications where the time required between the printing of consecutive records is too long for the results desired.

With cyclic printing, it is possible to shorten the interval between the printing of closely spaced records only by increasing the speed of the print wheel carriage across scale, inasmuch as the printing cycle is fixed by the maximum possible distance between records namely, the time required for full scale travel. Increasing the speed of the print wheel carriage, however, increases the speed of other associated moving parts in the instrument and unnecessarily increases wear.

In accordance with the present invention, balance printing is employed for the purpose of speeding up the printing action without requiring a corresponding increase in the speed of the print wheel carriage and associated mechanism. To this end, the action of the printing mechanism is controlled by the measuring circuit so that printing will take place promptly upon the attainment of balance of the instrument. Consequently, there is no delay in printing or recording once the instrument is in balance.

Thus another specific object of the present invention is to provide means for utilizing the high frequency signal in the operation of a multiple measuring and recording, balance printing instrument to actuate a recording element, or to actuate a selector switch, or to actuate both the recording element and the selector switch, as soon as balance is obtained in the measurement of the voltages of thermocouples or other sources of measurable voltages which the selector switch connects to the measuring apparatus, one after another, in predetermined order.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Figure 1:
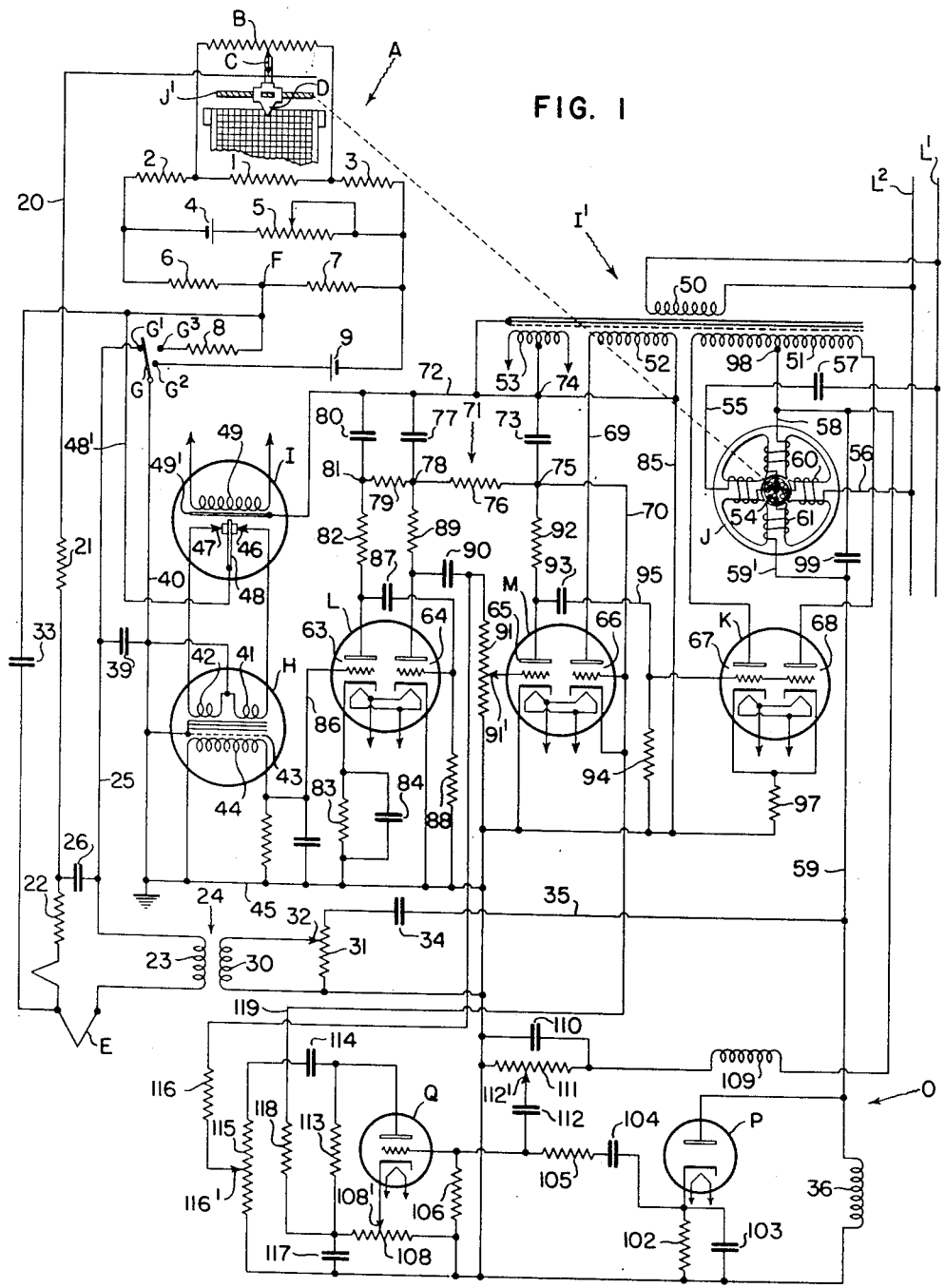
Fig. 1 is a diagrammatic representation of potentiometric measuring apparatus including an amplifier combined with means for utilizing the amplifier in creating a high frequency oscillating circuit for control purposes.

In Fig. 1, I have diagrammatically illustrated the use of the present invention in potentiometric measuring and control apparatus of the so-called conversion type disclosed in the Walter P. Wills Patent 2,423,540, granted July 8, 1947, on an application, filed December 1, 1941. In the apparatus shown, potentiometric rebalancing operations are effected by a reversible electric motor J, and an automatic control system which controls the operation of the motor J and includes an electronic amplifier and means comprising a pulsator I and a transformer H cooperating to impress on the electronic amplifier an alternating control voltage varying in magnitude and phase with the magnitude and direction of potentiometer unbalance produced by a change in the voltage of a thermocouple E.

The apparatus shown diagrammatically in Fig. 1 comprises a potentiometric bridge circuit A including a slidewire resistance B along with a slider contact C is adjusted through a shaft J' which is rotated by the motor J and is in threaded engagement with the pen carriage D carrying the contact C. The potentiometric bridge circuit A is shown as being of conventional type, comprising one branch including series connected resistances 1, 2 and 3, an energizing branch connected in parallel with the first mentioned branch and including a source of current 4 and a regulable resistance 5 connected in series, and a third branch connected in parallel with the energizing branch and with the first mentioned branch and including series connected resistances 6 and 7. The slidewire resistance B is connected in parallel with the resistance 1 between and in series with the resistances 2 and 3.

Associated with the bridge circuit A is a standardizing switch. The latter, as conventionally shown, comprises a movable two position switch member G and switch contacts G', $G^2$ and $G^3$. In the normal operating position of the switch member G, it engages the contact G' and connects the thermocouple E between the slider contact C and the junction point F of the bridge resistances 6 and 7. In its recalibrating position, the switch member G engages and forms a bridge connection between the contacts $G^2$ and $G^3$ and thereby connects a resistance 8 and a standard cell 9 in series with the bridge resistance 7. In respect to its features just specifically mentioned, the apparatus shown diagrammatically in Fig. 1 does not differ significantly from the apparatus shown in said prior Wills application.

As shown, the circuit branch connecting slider contact C and bridge point F includes in series between the contact C and switch contact G', the thermocouple E, conductor 20, resistances 21 and 22, the secondary winding 23 of a transformer 24, and a conductor 25. The circuit elements 22, 24, E and 23 are shunted by a condenser 26. The transformer 24 couples the input and output circuits of the electronic amplifying and control system shortly to be described. The primary winding 30 of the transformer 24 has one terminal connected to the grounded terminal of a potentiometer resistance 31, and has its second terminal 32 engaging the potentiometer at a point adjustable along the length of the latter. The ungrounded terminal of the potentiometer 31 is connected by a condenser 34 and a conductor 35 to a conductor 59 which has one end connected to ground through a choke coil 36 and has its other end connected to one terminal 59' of the control winding 61 of the motor J. As those skilled in the art will understand, the adjustment of the transformer terminal 32 along the potentiometer 31 varies the magnitude of the feed-back or regenerative effect transferred to the amplifier input circuit from the amplifier output circuit in which the motor winding 61, conductor 59 and choke coil 36 are included. A condenser 33 is connected between the bridge point F and the terminal of the thermocouple E to which is connected the resistance 22.

The circuit connection between the switch contact G' and the bridge point F closed by the movement of the switch member G into engagement with the contact G', includes a conductor 40 connecting the switch member G to the midpoint of the sections 41 and 42 of the primary winding of the transformer H. A condenser 39 connects the conductors 40 and 25 for a purpose hereinafter explained. The core structure and casing of the transformer H and a shield 43 interposed between the transformer primary windings and its secondary winding 44 are connected to a grounding conductor 45. The latter is also connected to the junction point of the primary winding sections 41 and 42. The remote ends or terminals of the primary winding sections 41 and 42 are connected to the stationary contacts 46 and 47 respectively of the vibrator I. The latter comprises a vibrating reed 48 carrying a contact moved by the vibration of the reed back and forth between the contacts 46 and 47 which it alternately engages.

The vibrating contact 48 is connected by conductor 48' to the bridge point F. The reed 48 is caused to vibrate by a winding 49 having its terminals connected to a source of alternating current. A grounded permanent magnet 49' is associated with the reed 48 for polarizing and synchronizing purposes, and in operation the reed 48 is in continuous vibration with a frequency corresponding to that of the source of energization for the winding 49. In consequence, the currents flowing alternately through the winding sections 41 and 42 create alternating voltages in the secondary winding 44 well adapted for amplification in the electronic relay to the input terminals of which the terminals of the transformer secondary winding 44 are connected.

Said electronic relay comprises a drive section and an amplifying section, both of which receive energizing current from a transformer I' having its primary winding 50 connected to the supply conductors L' and L² and having three secondary winding sections 51, 52 and 53. The drive section of the electronic relay comprises the reversibly rotating motor J and an electronic tube K. The amplifying section comprises amplifying tubes L and M.

The motor J, as diagrammatically shown, comprises a rotor 54 mechanically coupled to the threaded shaft J', the rotation of which, as diagrammatically shown, simultaneously adjusts the contact C and the pen carriage D. The motor J has a pair of terminals 55 and 56 connected through a condenser 57 of suitable value to the alternating supply conductors L' and L², and has a second pair of terminals 58 and 59'. The terminal 58 is connected to the midpoint 98 of the secondary winding 51, and terminal 59' is connected to the conductor 59. For its intended use, the motor J may be of the form schematically shown in the drawings in which one pair of oppositely disposed field poles is surrounded by a winding 60 connected between the motor terminals 55 and 56, and the other pair of poles is surrounded by a winding 61 connected between the motor terminals 58 and 59'.

Since the value of the condenser 57 is so chosen as to produce with the winding 60 a series resonant circuit, the current flowing through the motor winding 60 will be approximately in phase with the voltage of the alternating supply conductors L' and L². The current supply to the winding 61 will either lead or lag the voltage of the alternating current supply conductors L' and L² by approximately 90°. The windings 60 and 61 thus establish fields in the motor J which are displaced from one another approximately 90° in one direction or the other, depending upon whether the winding 61 is energized with current which leads or lags the voltage of the alternating supply conductors L' and L². As will become apparent from the subsequent description, the phase of the current flow through the winding 61 and the rotation of the rotor 54 depends upon, and is controlled by, the direction of unbalance of the potentiometric measuring circuit, and the duration of said rotation depends on the duration of said unbalance so that the rotation of the rotor 54 tends to adjust the contact C to the extent as well as in the direction to rebalance said circuit.

The alternating voltage generated in the secondary winding 44 of the transformer H is amplified through the action of the amplifying tubes L and M and the amplification thus effected is utilized in energizing the phase winding 61 of the motor J to control the selective actuation of the latter for rotation of the rotor 54 in one direction or the other.

As shown, the electronic amplifying tube L includes two heater type triodes within the same envelope and designated by the reference symbols 63 and 64. The triode 63 includes anode, control electrode, cathode, and heater filament elements, and the triode 64 includes like elements. The filaments of the triodes 63 and 64 are connected in parallel and receive energizing current from the low voltage secondary winding 53 of the transformer I'. The conductors through which the secondary 53 supplies current to the heater filaments of the electronic tube L and also to the heater filaments of the tubes M, K, P, and Q have not been shown in order not to confuse the drawings.

The electronic amplifying tube M includes two heater type triodes, designated by the reference characters 65 and 66, and within the same envelope. Both of the triodes of tube M include anode, control electrode, cathode and heater filament elements. The electronic tube K also includes two heater type triodes which have been designated by the reference characters 67 and 68, within the same envelope, and include anode, control electrode, cathode, and heater filament elements.

The triode 66 of the electronic valve M is utilized as a half-wave rectifier to provide a source of direct current voltage for energizing the anode or output circuits of the triodes 63, 64 and 65. As shown, the control electrode and cathode of the triode 66 are directly connected to each other, and the output circuit thereof is energized by the transformer secondary winding 52 through a circuit which may be traced from the left end terminal of the winding 52, as seen in the drawings, through the conductor 69 to the anode of the triode 66, the cathode thereof, and through a conductor 70 to the positive input terminal 75 of a filter generally designated by the reference numeral 71. The negative terminal 74 of filter 71 is connected by a conductor 72 to the right end terminal of the transformer secondary winding 52, which in turn is connected through the conductor 85 to the grounded conductor 45.

The filter 71 includes a condenser 73 which operates to smooth out the ripple in the output voltage of the filter between the points 74 and 75. The filter 71 also includes a resistance 76 and a condenser 77 which operate to smooth out the output voltage of the filter between the points 74 and 78. The filter 71 includes a further resistance 79 and a condenser 80 for smoothing out the output voltage between the filter points 74 and 81. The filter, therefore, comprises three stages. Such a three-stage filter is provided because for satisfactory and efficient operation it is desirable that the anode voltage supplied to the triode 63 be substantially free from ripple whereas it is not necessary to supply anode voltage so completely free from ripple to the output circuit of the triode 64. Likewise it is not necessary to supply anode voltage as free from ripple to the triode 65 as to the triode 64.

The anode circuit of the triode 63 may be traced from the filter point 81, which comprises the positive output terminal of the filter, through a fixed resistance 82 to the anode of the triode 63, to the cathode thereof, and through a cathode biasing resistance 83, which is shunted by a condenser 84, to the negative filter point 74 through the previously mentioned grounded conductor 45, the conductor 85 and the conductor 72. The cathode biasing resistance 83 and the parallel connected condenser 84 are utilized for biasing the control electrode of the triode 63 negatively with respect to its associated cathode.

The input circuit of the triode 63 may be traced from the cathode to the parallel connected resistance 83 and condenser 84 through the transformer secondary winding 44, and a conductor 86 to the control electrode of the triode 63.

The output circuit of the triode 63 is resistance-capacity coupled to the input circuit of the triode 64 by means of a condenser 87 and a resistance 88. More particularly, the anode of the triode 63 is connected by condenser 87 to the control electrode of the triode 64 and the control electrode of the triode 64 is connected through the resistance 88 to the grounded conductor 45 and thereby to the cathode of the triode 64. The anode circuit of the triode 64 may be traced from the positive terminal 78 of the filter 71 through a fixed resistance 89 to the anode of the triode 64, the cathode thereof, and conductors 45, 85 and 72 to the negative terminal 74 of the filter.

The output circuit of the triode 64 is resistance-capacity coupled to the input circuit of the triode 65 by means of a condenser 90 which is connected between the anode of the triode 64 and the control electrode of the triode 65, and by means of a resistance 91 which is connected between the control electrode of the triode 65 and the grounded cathode thereof. It is noted that the resistances 88 and 91 which are connected to the input circuits of the triodes 64 and 65, respectively, operate to maintain the control electrodes of the triodes 64 and 65 at the same potentials as their associated cathodes when no voltage is induced in the transformer secondary winding 44, but upon the induction of an alternating voltage in the secondary winding 44, resistances 88 and 91 permit the flow of grid current between the control electrodes of the triodes 64 and 65 and their associated cathodes and thereby limit the extent to which the control electrodes of these triodes are permitted to go positive with respect to their associated cathodes. With the control electrode of triode 65 connected to the resistance 91 by an adjustable contactor 91', as shown, said resistance and contactor form a means for varying the amount of signal impressed on the control electrode of the triode 65 from the plate circuit of the triode 64.

The anode circuit of the triode 65 may be traced from the positive terminal 75 of the filter 71 through a fixed resistance 92 to the anode of the triode 65, the cathode thereof, and conductors 85 and 72 to the negative terminal 74 of the filter. The output circuit of the triode 65 is resistance-capacity coupled to the input circuits of the triodes 67 and 68 by means including a condenser 93 and a resistance 94.

As illustrated, the condenser 93 is connected between the anode of the triode 65 and a conductor 95 which in turn is connected to the control electrodes of the triodes 67 and 68, and the conductor 95 is also connected to the cathodes of those triodes through the resistances 94 and 97. Specifically, the resistance 94 is connected between the conductor 95 and ground, and the resistance 97 is connected between the cathodes of the triodes 67 and 68 and ground. The resistance 94 limits the extent to which the control electrodes of the triodes 67 and 68 may be driven positive with respect to their associated cathodes.

A voltage is supplied to the output circuits of the triodes 67 and 68 from the high voltage secondary winding 51 of the transformer I'. The anode of the triode 67 is connected to the left end terminal of the transformer secondary winding 51 and the anode of the triode 68 is connected to the right end terminal of the transformer secondary winding 51. The cathodes of the triodes 67 and 68 are connected together and through the fixed resistance 97 to ground, and the terminal 59' of the motor J is connected to ground through the choke coil 36 as previously explained. The terminal 58 of the motor J is connected to the center tap 98 on the transformer secondary winding 51. Thus, the triodes 67 and 68 are utilized for supplying energizing curent from the transformer secondary winding 51 to the phase winding 61 of the motor J.

The motor J is preferably so constructed that the impedance of the winding 61, when paralleled by a suitable condenser, is of the proper value to match the impedance of the anode circuits of the triodes 67 and 68, when the motor is operating, in order to obtain the most efficient operation. Preferably, the motor is so constructed that it has a high ratio of inductance to resistance, for example, of the order of 6:1 or 8:1 at the frequency of the energizing current supplied to it. This provides for maximum power during the running condition of the motor with the least amount of heating, and also provides a low impedance path for braking purposes.

As noted hereinbefore, energizing current is supplied to the motor winding 60 from the alternating current supply conductors $L^1$ and $L^2$ through the condenser 57. As previously explained, the condenser 57 is so selected with respect to the inductance of the motor winding 60 as to provide a series resonant circuit having a unity power factor. By virtue of the series resonant circuit, the total impedance of the motor winding 60 is substantially equal to the resistance of the winding, and since this resistance is relatively low, a large current flow through the winding 60 is made possible. This permits the attainment of maximum power and torque from the motor J. In addition, the current flow through the motor winding 60 is in phase with the voltage of the alternating current supply conductors $L^1$ and $L^2$ because of the series resonant circuit. The voltage across the motor winding 60, however, leads the current by substantially 90° because of the inductance of the winding 60.

Energizing current is supplied the motor winding 61 from the transformer secondary winding 51 through the anode circuits of the triodes 67 and 68 through the circuits previously traced. A condenser 99 is connected in parallel with the motor winding 61 and is so chosen as to provide a parallel resonant circuit having a unity power factor. This parallel resonant circuit presents a relatively high external impedance and a relatively low local circuit impedance. The relatively high external impedance is approximately the same as the impedance of the anode circuits of the triodes 67 and 68, and accordingly, provides efficient operation. The relatively low internal circuit impedance approximates the actual resistance of the winding 61, and since this resistance is relatively low, the impedance of the local circuit is also relatively low.

For the first half cycle of the alternating voltage produced across the terminals of the transformer secondary winding 51, the anode of the triode 67 is rendered positive with respect to the center tap 98, and during the following half cycle the anode of the triode 68 is rendered positive with respect to the center tap. Accordingly, the triodes 67 and 68 are arranged to conduct on alternate half cycles of the alternating current supplied by the supply conductors L¹ and L².

When no signal is impressed upon the control electrodes of the triodes 67 and 68, pulsating unidirectional current of twice the frequency of the alternating voltage supplied by conductors L¹ and L² is impressed on the motor winding 61. When thus energized the motor J is not urged to rotation in either direction but remains stationary. Due to the relatively high direct current component of the current then flowing through the motor winding 61, the core structure of the motor winding J tends to become saturated whereby the inductive reactance of the motor winding 61 is made relatively small. The value of the condenser 99, in shunt to the motor winding 61, is so chosen that the condenser and motor winding then provide a parallel resonant circuit. This saturation of the core structure of the motor J operates to exert an appreciable damping effect on the rotor 54, or in other words, an effect tending to prevent rotation of the rotor 54. Consequently, if the rotor 54 has been rotating, saturation of the motor core structure operates to quickly stop the rotation.

When an alternating signal voltage is impressed on the control electrodes of triodes 67 and 68, the magnitude of the pulses of current flowing in the anode circuit of one triode 67 or 68 will be increased while the magnitude of the pulses of current flowing in the anode circuit of the other triode 68 or 67 will be decreased. Accordingly, the pulses of unidirectional current supplied to the motor winding 61 during the first half cycle will predominate over those supplied the motor winding during the second half cycle. Which anode current will be increased depends upon whether the signal voltage is in phase or 180° out of phase with the voltage of supply conductors L¹ and L².

Such energization of the motor winding 61 operates to introduce therein an alternating component of current of the same frequency as that supplied by the alternating current supply conductors L¹ and L². This alternating component of current will either lead or lag the alternating current flowing through the motor winding 60 by approximately 90° depending upon which of the triodes 67 and 68 has its anode current increased by the prevailing grid signal voltage, and with either phase relation the two currents produce a magnetic field in the motor core structure which rotates in one direction or the other, depending upon said current phase relation, and effects rotation of the motor rotor 54 in the corresponding direction. Moreover, when the motor winding 61 is so energized the direct current component of the current flowing therein is decreased, and consequently, the saturation of the motor core structure is decreased with the result that the rotor damping effect is reduced.

When the temperature of the thermocouple E is steady and the positions of the pen carriage D and the contact C are correct for that temperature, no signal potential is transmitted to the controlling electrodes of the triodes 67 and 68 by the anode circuit of the triode 65. Since the grid bias potential is then zero, the rotor 54 of the motor J has no tendency to rotate. Upon an increase in the temperature of the thermocouple E, a signal potential will be applied to the control electrodes of the triodes 67 and 68 by the anode circuit of the triode 65 which will result in rotation of the motor J in a direction to move the pen carriage D up-scale. Conversely, upon a decrease in the temperature of the thermocouple E, a signal potential will be applied to the control electrodes of the triodes 67 and 68 by the anode circuit of the triode 65 which will result in rotation of the motor J in a direction to give the pen carriage D a down-scale adjustment.

As will be readily apparent, with the transformer 24 coupling the output and input circuits of the electronic amplifying system as shown, energy may be transferred from the output circuit to the input circuit of the amplifying system as required for the maintenance of an oscillating current flow at a frequency determined by the parameters of the coupled circuits. The electronic amplifying and control system shown in Fig. 1 is of a standard and well known type, which has been in extensive use in this country for several years, and typical values of its resistance, inductance, and capacitance elements, and of its energizing voltages, are well known.

For the general purposes of the present invention, the precise frequency of the high frequency oscillation current maintained is not critical. Advantageously, however, it is of the order of 15 to 20 kilocycles, in which frequency range the amplifier gain is considerably lower than in its normal operating range of 60 cycles and the lower harmonics thereof. Consequently, the high frequency oscillation does not overload the amplifier, nor significantly interfere with the available amplifier power output. To maintain current oscillations of that frequency in the standard amplifying system shown, primary and secondary windings 29 and 30 form a part of the regenerative circuit. Appropriate capacitance values for condensers 26, 33 and 39, are 500, 0.1 and 0.5 microfarads, respectively. The resistances 21 and 22 may be 25 and 150 ohms, respectively. The resistance 31 may be 500 ohms, the capacity of the condenser 34 may be 0.001 microfarad, and the inductance of the choke coil 36 may be 30 millihenries. The resistance 22 is a damping resistor, and the resistance 21 is employed to minimize the effect of changes in resistance of the potentiomter circuit between the point F and the contact C as the latter is moved along the range of the slide wire resistance B.

As is readily apparent, there are three circuit branches for high frequency current flow connected in parallel to the secondary winding 23 of the coupling transformer 24, namely: the branch including the damping resistor 22, thermocouple E, and condenser 26; the branch including the condenser 26, slider contact C, bridge point F, condenser 33, thermocouple E, and the measuring bridge circuit connecting said contact and point; and the circuit including thermocouple E, condenser 33, conductor 48', vibrator switch 48, transformer primary windings 41 and 42, and switch contact members G and G'. The condenser 39 maintains a high frequency current path of flow through the last mentioned circuit branch during the standardizing operation in which the switch member G is disconnected from the contact member G'. The circuit branch including the damping resistor 22 is of relatively high impedance which does not vary in operation, and proper operation could be maintained even if the value of resistance 22 were materially lower than 150 ohms. The resistance 21 is needed because resistance of the measuring circuit between the contact C and point F varies quite widely as the contact C is adjusted, and can be quite low when that contact is at one end of its range of movement.

With the standard amplifying and control system shown, the high frequency oscillation current will ordinarily be created during alternate half-cycles only of the relatively low frequency alternating supply voltage used in energizing the power stage of the system. This is due to the fact that the phasing of the input transformer H changes during each half cycle and one phase only is suitable for generation of high frequency signals. However, if an excessive amount of feed back signal is supplied to the thermocouple input circuit, high frequency oscillations may be produced during each half cycle, probably as a result of the capacitance coupling between the windings of the input transformer H.

As will be understood, the currents supplied to the vibrator winding 49 and to the transformer winding 50 have the same relatively low frequency. Its precise value is not critical. It is herein assumed that the relatively low frequency is 60 cycles per second, as is usual in the use of apparatus of the general type disclosed.

In the contemplated operation of the apparatus disclosed herein, the high frequency signal either rides through the amplifier on top of the relatively low frequency signal undergoing amplification, or is eliminated by amplifier valve cutoff or saturation action, depending on the amplitudes of the signals. The conditions of operation under which the high frequency signal will and will not ride through the amplifier on the 60 cycle signal may be varied by changing the amplitude of either or both of said signals. In ordinary practice, however, the apparatus must be so proportioned and arranged that the maximum normal amplitude range of the 60 cycle signal is that required to insure the desired operation characteristics of the relay motor J. It is readily possible, however, to make the amplitude of the high frequency signal such that that signal will be readily detectable in the amplifier output circuit at all times in which the 60 cycle signal is not abnormally high, or to make the amplitude of the high frequency signal such that it will not be detectable except when the 60 cycle signal becomes relatively very low, as it does when balance is closely approached in the final stage of a rebalancing operation.

In this connection, assume that the apparatus is so proportioned and arranged that with intermediate values of the two signal currents, the high frequency signal will appear in the amplifier output circuit superimposed upon the peak portions of the low frequency signal current.

With apparatus so proportioned and arranged, the extent of increase in the low frequency signal current required to prevent the appearance of the high frequency signal in the output circuit may be increased and decreased by respectively increasing and decreasing the high frequency signal current.

In general, the amplitude of the 60 cycle signal impressed on the third stage amplifier valve 65 should be such that the high frequency signal will or will not appear in the amplifier output circuit under operating conditions varying with the purposes for which the signal is utilized. Thus when used for so-called "safe failure" purposes, i. e., to indicate and minimize the injurious consequences of certain apparatus failure, it is ordinarily desirable that the high frequency signal should be continuously apparent in the amplifier output circuit except when the apparatus becomes inoperative in some way causing disappearance of the high frequency signal due to interruption of the high frequency signal or disappearance or significant enlargement of the 60 cycle signal amplitude.

Such disappearance of the high frequency signal may be caused by a thermocouple break, an incipient thermocouple failure resulting in a substantial increase in thermocouple resistance, the failure of any of the voltage amplifier tubes, or the development of any defect in the control system causing any one of the amplifier tubes to be overdriven. Furthermore, any mechanical failure of the motor preventing the latter from rotating will soon interrupt the high frequency current as the resultant measuring circuit unbalance increases so that a 60 cycle voltage signal will be impressed on the amplifier, which is large enough to overdrive any of the amplifier tubes. For other purposes, and particularly for the motor damping and printer and selector switch control actions previously mentioned, the amplitudes of the two signals should be such that the high frequency signal will appear in the amplifier output circuit only on the reduction in the 60 cycle signal which occurs when the bridge circuit is in or approaches closely to balance.

Apparatus such as shown in Fig. 1, proportioned and arranged to prevent the high frequency signal from appearing in the amplifier output circuit except during periods in which the measuring circuit is in or near balance, is not well adapted for use in detecting and preventing injurious results from apparatus failure. It is to be noted, however, that even in the contemplated motor damping use of the apparatus shown in Fig. 1, an apparatus defect which will prevent the appearance of the amplified high frequency signal when balance is obtained will give an indication that the apparatus is defective.

In my copending application, Ser. No. 678,255, filed of even date herewith, now Patent No. 2,457,791 of December 28, 1948, I have illustrated forms of the invention generically claimed herein, which are especially devised and adapted for use in detecting and preventing injurious consequences in certain apparatus failures in such measuring and amplifying apparatus as is shown in Fig. 1 hereof. The apparatus disclosed in said copending application differs significantly from that shown herein, only in that it includes detector circuits with associated control provisions, which differ from the detector circuits O and OA and associated control provisions shown in Figs. 1 and 3 hereof, and which are well adapted for safe failure use. Inasmuch as special forms of detector circuits with associated control provisions, devised for use of the invention for safe failure purposes, are fully disclosed and specially claimed in said copending application, and are not specifically claimed herein, it seems unnecessary to herein illustrate or further describe said special detector circuit forms.

The detector circuit arrangement O shown in Fig. 1, for detecting the absence or presence of amplified high frequency signals in the amplifier output circuit hereinbefore described, comprises a diode P having its anode connected to the conductor 59 and to the ungrounded side of the high frequency choke coil 36. The cathode of the diode P is connected to ground by a high frequency by-pass circuit comprising a resistance 102 and a condenser 103 connected in parallel therewith. The diode P operates as a peak detector. The voltage across the resistance 102 is differentiated by means of a condenser 104 and resistances 105 and 106 which are connected in series with one another and with the condenser 104 between the cathode of the diode P and ground.

To provide a controllable feed back path, use is made of a triode Q, normally biased to cut-off by means of a potentiometer 108, to a variable intermediate point of which the cathode of the triode Q is connected through a slider contact 108'. The potentiometer 108 has one end connected to ground and has its other end connected to the anode of the triode Q as hereinafter explained. A feed back signal is applied to the control grid of the triode Q from the motor control winding 61 through a low-pass filter including a choke coil 109 and a condenser 110, with which is combined a potentiometer 111 having one terminal connected to ground and having its other terminal connected to the connected terminals of the choke coil 109 and condenser 110. A condenser 112 is connected between the control grid of the triode Q and a contact 112' adjustable along the potentiometer 111. The control grid of the triode Q is also connected to the junction between the resistances 105 and 106.

In operation, as the measuring system approaches balance, a positive voltage is suddenly developed across the load resistor 102 of the peak detector circuit. By means of the differentiating network comprising the condenser 104 and resistors 105 and 106, a derived positive pulse is impressed on the control grid of the triode Q. That pulse is of such magnitude as to overcome the bias voltage of the triode whereby the latter is made conductive. A portion of the voltage impressed on the motor control winding 61 after being divested of its high frequency component by the low pass filter is also applied to the control grid of the triode Q through the potentiometer 111 and the condenser 112.

While the motor J is running, the voltage impressed on its control winding 61 comprises a 60 cycle component which decreases in amplitude as the motor speed decreases. Through the described connection including choke 109, this 60 cycle component is fed back to the control grid of the triode Q, and is injected into the main amplifier, when the valve Q is made conductive as the system approaches balance, through the circuit including the load resistor 113 in the plate circuit of the valve Q, a condenser 114 having one terminal connected to ground through a potentiometer resistance 115, a resistance 116 connected between a slider contact 116' engaging the potentiometer 115, the ungrounded end of the potentiometer resistance 91, and the slider contact 91'. The circuit arrangement should be such that the feed back signal impressed through the triode Q on the control grid of the triode 65 is of such phase as to counteract the prevailing drive signal transmitted to the triode 65 from the triode 64, so that the effect of the signal transmitted through the triode Q is to reduce the prevailing motor speed, regardless of the direction of the latter.

The connected terminals of the potentiometer 108 and the plate circuit resistance 113 of the valve Q are connected to ground through a condenser 117, and are connected through a resistance 118 and a conductor 119 to the cathode of the triode 66, which, as shown, is connected as a diode or half-wave rectifier. Through the conductor 119, the half-wave rectifier 66 thus supplies direct current voltage to the anode circuit of the triode Q, as it supplies such voltage through the conductor 70 to the anode circuits of the triodes 63, 64 and 65.

As has been made apparent, the reduction of the motor speed decreases the 60 cycle component of the voltage impressed on the motor winding 61 until it completely vanishes. Simultaneously, with the described motor braking action, the positive pulse applied to the control grid of the triode Q also decays, so that the valve Q again becomes cut off, thus eliminating the feed back drive signal component. By proper adjustment, said feed back signal component can be eliminated shortly before balance is reached. This permits a positive system balance to be secured immediately thereafter, without creating a dead zone effect, since elimination of the feed back signal component leaves the motor in condition to quickly effect complete balance if balance has not already been reached.

The apparatus shown in Fig. 1, and hereinbefore described, is adapted to serve safe failure purposes since rupture of the thermocouple circuit, an undue increase in thermocouple resistance, an amplifying tube failure, or any apparatus failure which results in overloading the electronic valves, particularly the triode 65, will prevent the high frequency signal from appearing in the output circuit at any time.

Figure 2:
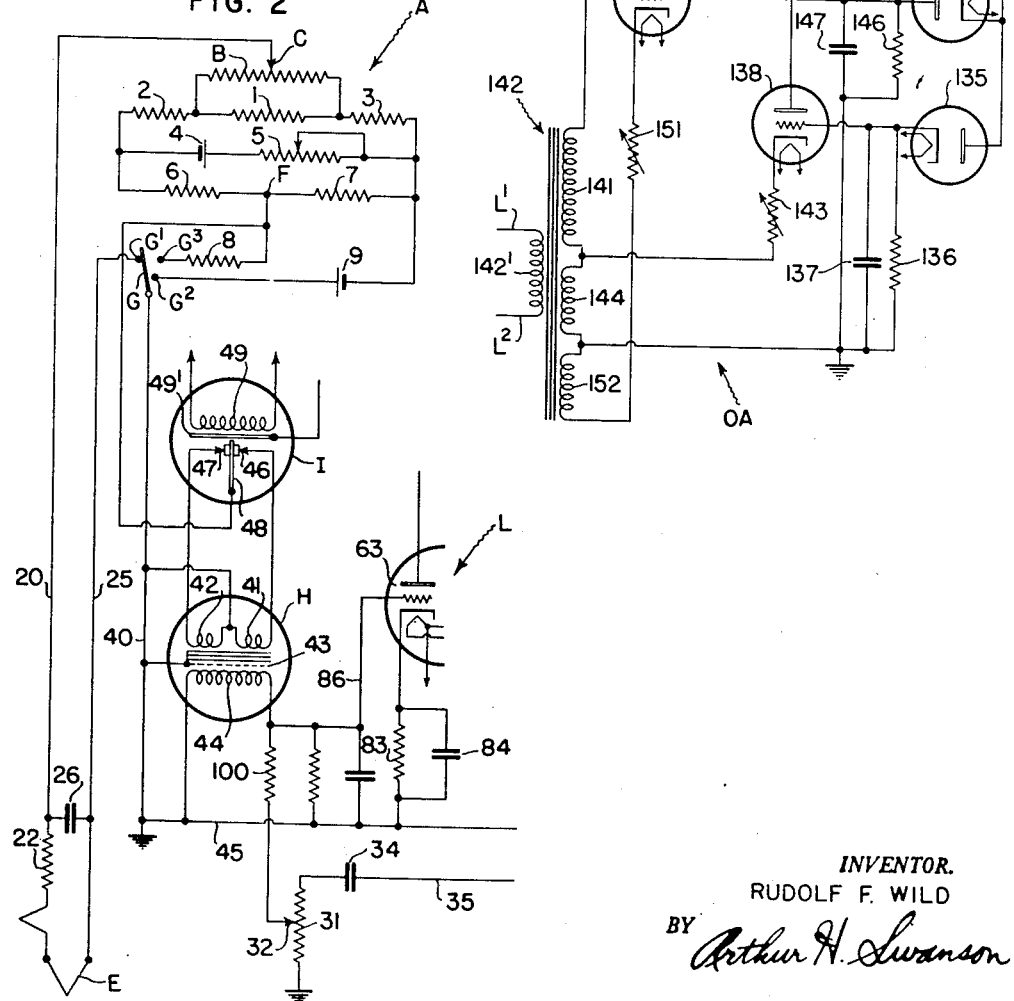
Fig. 2 is a diagram illustrating a modification of the apparatus shown in Fig. 1 wherein a different feed-back connection is employed.

In cases in which the safe failure feature is not required it may be omitted with considerable simplification of the circuit arrangement of Fig. 1, as shown in Fig. 2. In such case, the coupling connection between the input and output circuits need not include the thermocouple circuit or the transformer 24. As is shown in Fig. 2, the transformer 24 may be eliminated, and the potentiometer contact 32 may be directly connected to the conductor 86 through a resistance 106 and thereby to the control grid of the first stage amplifier triode 63. When the coupling connection between the amplifier input and output circuits thus excludes the thermocouple, the thermocouple circuit may be of the usual simple conventional form and may omit the resistance 21, and the condensers 38 and 39. The remainder of the circuit of Fig. 2 is identical with that of Fig. 1.

Figure 3:
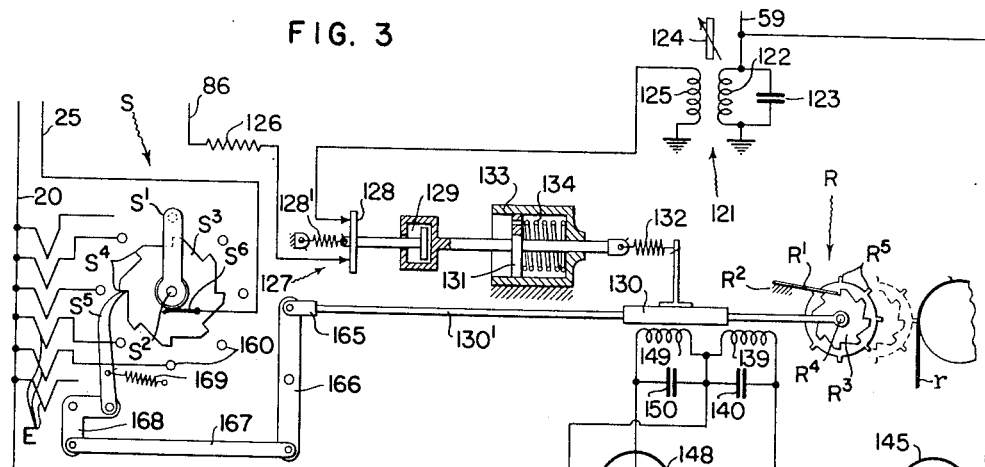
Fig. 3 is a diagram illustrating a modification of the apparatus shown in Fig. 1, devised for use in actuating a selector switch and recorder of a multiple point potentiometer.

In Fig. 3 I have illustrated the use of the present invention in actuating the printing element R and selector switch S of a multi-recording self-balancing potentiometer of the balance printing type. In respect to the potentiometric measuring circuit and the rebalancing motor and its amplifying and control system through which the measuring circuit condition controls the operation of the rebalancing motor, the apparatus shown in part in Fig. 3 may be and is assumed to be identical with apparatus shown diagrammatically in Fig. 1. To simplify the illustration, I omit from Fig. 3 all portions of the measuring and amplifying apparatus shown in Fig. 1, except the amplifier input and output conductors 86 and 59, respectively, and the conductors 20 and 25 for connecting a thermocouple to the measuring circuit.

As previously mentioned, the balance printing type of multiple recorder is superior to the cyclic printing type for applications wherein the variables being measured are rapidly changing. In the balance printing recorder a record is made each time the instrument is balanced, with the result that rapid changes in the measured variables are recorded, whereas in the cyclic printing recorder, successive records are made only at regular, fixed intervals, these intervals being dependent on the maximum time required to obtain balance in the instrument after a maximum change in one of the measured variables, and often being of such long duration as to make impossible the recording of rapid changes in these variables.

In Fig. 3 the input and output circuits of the amplifying system are coupled by means including a transformer 121 having one terminal of its primary winding 122 connected to the output conductor 59, and having its other terminal connected to ground. A condenser 123 is connected in shunt to the transformer primary 122 to form a low impedance ground connection for the low frequency or 60 cycle signals in the conductor 59. The transformer 121 has a movable iron core 124 which by its adjustment varies the mutual inductance of the transformer primary winding 122 and secondary winding 125. The latter has one terminal connected to ground and has its other terminal connected to the amplifier input conductor 86 through a resistance 126 and a switch 127.

The switch 127 includes a movable contact member 128 which is moved to open and close the coupling circuit by movements to the right and left, respectively, of a reciprocating member 130 which may be the plunger or armature of an electromagnetic relay including longitudinally displaced windings 139 and 149 alternately energized as hereinafter described. The opening and closing movements of the switch member 128 do not occur simultaneously with the corresponding actuating movements of the plunger 130, but are delayed somewhat for purposes hereinafter explained. As diagrammatically illustrated, the switch member 128 is also biased to its closed position by a light spring 128' and is given belated movements as a result of its connection to a dashpot piston 131 through a lost motion connection 129, and the connection of the dashpot piston 131 to the plunger 130 through a relatively strong spring 132. The piston 131 works in a stationary dashpot cylinder 133 and a relatively light spring 134 biases the piston for movement relative to the dashpot cylinder in the direction to move the contact member 128 into its closed position. When the plunger 130 is in its left-hand normal or rest position, the spring 134 holds the piston 131 in the position in which the contact member 128 is in its closed position and the lost motion connection 129 is in its contracted condition. When the plunger 130 is moved to its right-hand position, the dashpot action of the cylinder 133 and piston 131 prevents the piston from moving to the right with the plunger speed. In consequence, the spring 132 is put under a tension which slowly moves the piston to the right as air is forced out of the closed end of the dashpot cylinder. The movement thus given the dashpot piston first elongates the lost motion connection 129 and then moves the contact member 128 to its open position. The light spring 128' insures that the expansion of the lost motion connection will invariably precede the movement of the contact member 128 to its open position. When the plunger 130 is returned to its rest position, the closing movement of the member 128 is retarded by the dashpot action until the spring 134 gives the piston 131 the necessary motion to the left. After the member 128 moves into its closed position the movement of the piston 131 under the action of the spring 134 continues until the lost motion connection is contracted.

In the contemplated operation of the apparatus shown in Fig. 3, a high frequency signal is caused to appear in and disappear from the amplifier output circuit as the measuring circuit is balanced and unbalanced, exactly as in the apparatus shown in Fig. 1. The appearance and disappearance of the high frequency signal causes the movements of the plunger 130 to the right and left, respectively, through the detector and control circuit arrangement OA shown in Fig. 3 and comprising a diode 135 having its anode connected to the output conductor 59 and having its cathode connected to ground through a resistance 136 and a by-pass condenser 137 connected in parallel therewith. The cathode of diode 135 is also connected to the control grid of a triode 138.

The plate circuit of the triode 138 includes the previously mentioned electromagnetic relay winding 139 and the secondary winding 141 of a transformer 142. The latter has its primary winding 142' connected to a power line which ordinarily comprises the conductors $L^1$ and $L^2$ supplying low frequency energizing current for energizing the motor J. The winding 139 is shunted by a condenser 140 and serves when energized to pull the plunger 130 to the right. The cathode of the triode 138 is also connected to ground through a sensitivity control rheostat 143 and a second secondary winding 144 of the transformer 142.

A second diode 145 has its cathode connected to the output conductor 59 and has its anode connected to ground through the load resistor 146 which is shunted by a by-pass condenser 147. The anode of the diode 145 is also connected to the control grid of a triode 148. The plate circuit of the triode 148 includes the second winding 149 of the electromagnetic relay which when energized moves the plunger core 130 to the left. The winding 149 is shunted by a by-pass condenser 150. The plate circuit of the triode 148 also includes the previously mentioned transformer secondary windings 141 and 144, and a third secondary winding 152 of the transformer 142. A sensitivity control rheostat 151 is interposed between the cathode of triode 148 and the transformer secondary 152.

In operation, the valve 148 is conducting when there is no high frequency signal in the output circuit of the amplifier and the valve 138 is then non-conducting, so that the electromagnetic relay winding 149 is then energized, and the plunger 130 held in its left-hand, or rest position. When a high frequency signal appears in the output circuit conductor 59, a negative voltage is developed across the load resistor 146 and applied to the control grid of the tube 148, cutting off that tube and thereby deenergizing the relay winding 149. At the same time a positive voltage is developed across the load resistor 136 and applied to the control grid of the valve 138. This makes the valve 138 conducting and energizes the winding 139 and thus moves the relay plunger 130 to the right. The plunger 130 is operatively connected to the recorder print wheel R, so that movement of the plunger 130 to the right moves the print wheel R into recording engagement with the record chart r, as is indicated in dotted lines in Fig. 3. When the winding 139 is subsequently deenergized and the winding 149 is again energized, the resultant movement of the plunger 130 to the left returns the print wheel to its normal position, shown in full lines in Fig. 3. As the print wheel is moved from its dotted line position back to its full line position, a spring pawl R' anchored at R², engages a tooth of a ratchet wheel R³ carried by the shaft R⁴ of the print wheel R and gives the latter an angular movement. That movement carries the marking element R⁵ at the periphery of the print wheel which has just engaged the chart r out of printing position, and advances another marking element R⁵ into position to engage the record chart r when the plunger 130 is next moved to the right.

The previously described means through which the movement of the plunger 130 gives a delayed opening movement to the switch contact member 128 insures time for good printing contact of the appropriate marking element R⁵ with the chart r, followed by a suitably prompt return movement of the plunger 130 to its rest position. As soon as the switch member 128 opens the coupling circuit, by means of opening the switch 127, the high frequency signal disappears and the valve 138 becomes non-conductive and the valve 148 becomes conductive so that the winding 139 is deenergized and the winding 149 is re-energized, whereupon the plunger is returned to its normal position in which the printing wheel, is out of engagement with the record chart. After a brief interval following the movement of the plunger to the left, the switch member 128 is returned to its closed position by the conjoint action of the springs 128' and 134.

In the arrangement diagrammatically illustrated in Fig. 3 the return movement to the left of the relay plunger 130 actuates the selector switch S to disconnect the thermocouple E previously connected to the measuring circuit and to connect another thermocouple E to the measuring circuit. As diagrammatically shown, the selector switch S comprises a circular series of stationary switch contacts 160 each of which is connected to one terminal of each of the series of thermocouples E which are to be connected to the measuring circuit one at a time in regular succession. The second terminal of each of the thermocouples E is permanently connected to the measuring circuit through the conductor 20. The switch S, as diagrammatically shown, comprises a contact arm S' secured to an intermittently rotated shaft S². The shaft S² carries a ratchet wheel S³ which has teeth S⁴ and is advanced one tooth at a time on each return movement to the left of the plunger 130. Each such angular movement of the ratchet wheel moves the contact S' in a clockwise direction out of engagement with the contact 160 previously engaged, and into engagement with the adjacent contact 160. The contact 160 in engagement with the contact arm S' is connected to the measuring circuit through the conductor 25 which is connected to a brush S⁶ engaging the hub portion of the contact arm S'.

As shown, the plunger 130, on each movement to the left, advances the ratchet wheel S³ one tooth through a pawl S⁵ succesively engaging the teeth S⁴, and a lever and link arrangement connecting the pawl S⁵ to the plunger 130. The diagrammatically illustrated lever and link arrangement includes a link 165 to one end of which the stem portion 130' of the plunger 130 is connected. The other end of the link 165 is connected to one end of a lever 166 which has its second end connected by a link 167 to one arm of a bell crank lever 168. The second arm of the lever 168 is pivotally connected to the stem or shank of the pawl S⁵. The latter is biased into its tooth-engaging position by a spring 169. As will be readily apparent, the apparatus shown in Fig. 3 includes relatively simple means for insuring the operation of the recording element and selector switch of a multiple measuring and self-balancing instrument as soon as the measuring circuit is balanced in the course of each measuring operation.

Subject matter herein disclosed, but not herein claimed, is disclosed and claimed in my application Serial No. 678,255, now Patent No. 2,457,791 of December 28, 1948, and in my application Serial No. 678,258, both of which applications were filed of even date herewith; in my application Serial No. 735,009 which was filed March 15, 1947, and which issued as Patent No. 2,452,023 on October 19, 1948; in the application of R. F. Wild and L. B. Cherry, Serial No. 678,257, which was filed of even date herewith and which issued as Patent No. 2,457,792 on December 28, 1948; in the application of J. A. Caldwell, Serial No. 678,394, filed of even date herewith; and in the application of Herbert A. Clarke, Serial No. 678,254, also filed of even date herewith and now Patent No. 2,457,794 of December 28, 1948.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. Control apparatus comprising electronic amplifying means having an input circuit and an output circuit, means adapted to apply to said input circuit an undulating signal of relatively low frequency, means adapted to apply to said input circuit and thereby superimpose upon the relatively low frequency undulating signal a relatively high frequency undulating signal, said last mentioned means comprising a regenerative feed-back connection between said input and said output circuits, a first control means selectively responsive to the relatively low frequency undulating signal connected in the output circuit of said electronic amplifying means, and a second control means selectively responsive to the relatively high frequency undulating signal connected in the output circuit of said electronic amplifying means.

2. Control apparatus comprising electronic amplifying means having an input circuit and an output circuit, means adapted to apply to said input circuit an undulating signal of relatively low frequency, means adapted to apply to said input circuit and thereby superimpose upon the relatively low frequency undulating signal a relatively high frequency undulating signal, said last mentioned means comprising a regenerative feed-back connection between said input and said output circuits, a first control means selectively responsive to the relatively low frequency undulating signal connected in the output circuit of said electronic amplifying means, and a second control means selectively responsive to the relatively high frequency undulating signal connected in the output circuit of said electronic amplifying means, said second control means controlling the response of said first control means to the relatively low frequency undulating signal.

3. Control apparatus comprising electronic amplifying means having an input circuit and an output circuit, means adapted to apply to said input circuit an undulating signal of relatively low frequency, means adapted to apply to said input circuit and thereby superimpose upon the relatively low frequency undulating signal a relatively high frequency undulating signal, said last mentioned means comprising a regenerative feed-back connection between said input and said output circuits, a first control means selectively responsive to the relatively low frequency undulating signal connected in the output circuit of said electronic amplifying means, a second control means selectively responsive to the relatively high frequency undulating signal connected in the output circuit of said electronic amplifying means, said second control means controlling the response of said first control means to the relatively low frequency undulating signal, and means operative after a predetermined time interval to render ineffective the control of said first control means by said second control means.

4. Control apparatus comprising electronic amplifying means having an input circuit and an output circuit, means operative to derive from a source of direct current voltage an undulating signal of relatively low frequency and including means to apply said undulating signal to said input circuit, means adapted to apply to said input circuit and thereby superimpose upon the relatively low frequencies undulating signal a relatively high frequency undulating signal, said last mentioned means comprising a regenerative feed-back connection between said input and said output circuits, a first control means selectively responsive to the relatively low frequency undulating signal connected in the output circuit of said electronic amplifying means, and a second control means selectively responsive to the relatively high frequency undulating signal connected in the output circuit of said electronic amplifying means.

5. A combination as specified in claim 1, in which the combination elements are so arranged and proportioned as to maintain such signal current amplitudes that the relatively high frequency signal appears in said output circuit only when the relatively low frequency signal approaches a minimum value.

6. Control apparatus comprising electronic amplifying means having an input circuit and an output circuit, means adapted to apply to said input circuit an undulating signal of relatively low frequency, means adapted to apply to said input circuit and thereby superimpose upon the relatively low frequency undulating signal a relatively high frequency undulating signal, said electronic amplifying means being characterized in that the relatively high frequency undulating signal appears in the output circuit thereof accordingly as the magnitude of the relatively low frequency undulating signal is above or below a predetermined value, a first control means selectively responsive only to the relatively low frequency undulating signal connected in the output circuit of said electronic amplifying means, and a second control means selectively responsive to the relatively high frequency undulating signal connected in the output circuit of said electronic amplifying means.

7. Control apparatus comprising electronic amplifying means having an input circuit and an output circuit, means adapted to apply to said input circuit an undulating signal of relatively low frequency, means adapted to apply to said input circuit and thereby superimpose upon the relatively low frequency undulating signal a relatively high frequency undulating signal, said last mentioned means comprising a regenerative feed-back connection between said input and output circuits, said electronic amplifying means being characterized in that the relatively high frequency undulating signal appears in the output circuit thereof accordingly as the magnitude of the relatively low frequency undulating signal is above or below a predetermined value, a first control means selectively responsive only to the relatively low frequency undulating signal connected in the output circuit of said electronic amplifying means, and a second control means selectively responsive to the relatively high frequency undulating signal connected in the output circuit of said electronic amplifying means.

8. Control apparatus comprising electronic amplifying means having an input circuit and an output circuit, means adapted to apply to said input circuit an undulating signal of relatively low frequency, means adapted to apply to said input circuit and thereby superimpose upon the relatively low frequency undulating signal a relatively high frequency undulating signal, said electronic amplifying means being characterized in that the relatively high frequency undulating signal appears in the output circuit thereof accordingly as the magnitude of the relatively low frequency undulating signal is above or below a predetermined value, a first control means selectively responsive only to the relatively low frequency undulating signal connected in the output circuit of said electronic amplifying means, and a second control means selectively responsive to the relatively high frequency undulating signal connected in the output circuit of said electronic amplifying means, said second control means controlling the response of said first control means to the relatively low frequency undulating signal.

9. Control apparatus comprising electronic amplifying means having an input circuit and an output circuit, means adapted to apply to said input circuit an undulating signal of relatively low frequency, means adapted to apply to said input circuit and thereby superimpose upon the relatively low frequency undulating signal a relatively high frequency undulating signal, said electronic amplifying means being characterized in that the relatively high frequency undulating signal appears in the output circuit thereof accordingly as the magnitude of the relatively low frequency undulating signal is above or below a predetermined value, the frequency of the relatively high frequency undulating signal being selected in the frequency range in which the gain of said electronic amplifying means is appreciably lower than it is for the frequency range including the relatively low frequency undulating signal and the lower harmonics thereof, a first control means selectively responsive only to the relatively low frequency undulating signal connected in the output circuit of said electronic amplifying means, and a second control means selectively responsive to the relatively high frequency undulating signal connected in the output circuit of said electronic amplifying means.

10. A self-balancing measuring and control apparatus combination comprising a normally balanced circuit network, means unbalancing said network on a change in the value of a quantity measured, a reversible motor operable to rebalance said circuit when unbalanced, an amplifier including an input circuit and an output circuit and electronic valve amplifying means connected between said input and output circuits, said motor having a control winding connected to said output circuit, amplifier energizing means for supplying alternating current of a relatively low frequency to said amplifier, means impressing on said input circuit a signal which is of said relatively low frequency and varies in magnitude in predetermined proportion to the extent of network unbalance and is dependent in phase on the direction of network unbalance, and circuit means coupling said input and output circuits to transfer energy from said output circuit to said input circuit and thereby superimpose a relatively high frequency signal on the relatively low frequency signal impressed on said input circuit, predetermined variations in the condition of operation of said apparatus being operative to cause the appearance of or disappearance of the relatively high frequency signal in the output circuit of said amplifier.

11. A combination as specified in claim 10, in which the voltage of a source of D. C. voltage is the quantity measured and in which conversion apparatus is connected in a branch of said network with said source to convert unidirectional current flow in said branch into the relatively low frequency signal impressed on said input circuit.

12. A combination as specified in claim 10, in which the combination elements are proportioned and arranged to maintain such signal current amplitudes that the relatively high frequency signal appears in said output circuit only when said circuit network is in or near its balanced condition, and in which said combination includes a selector switch intermittently operable to successively connect a plurality of voltage sources one at a time in regular order to said circuit network, high frequency signal detecting means, and means actuated by said detecting means to operate said selector switch when the relatively high frequency signal appears in said output circuit.

13. A combination as specified in claim 10, in which the combination elements are proportioned and arranged to maintain such signal current amplitudes that the relatively high frequency signal appears in said output circuit only when said circuit network is in or near its balanced condition and in which said combination includes a device adapted to be actuated between two conditions of operation and normally maintained in one of said conditions, high frequency signal detecting means, and actuating means for said device energized by said detecting means to actuate said device into its second condition of operation when the relatively high frequency signal appears in said output circuit.

14. A combination as specified in claim 10, in which the combination elements are proportioned and arranged to maintain such signal current amplitudes that the relatively high frequency signal appears in said output circuit only when said circuit network is in or near its balanced condition and in which said combination includes a device adapted to be actuated between two conditions of operation and normally maintained in one of said conditions, high frequency signal detecting means, actuating means for said device energized by said detecting means to actuate said device into its second condition of operation when the relatively high frequency signal appears in said output circuit, means to deenergize said actuating means after said device is actuated into its second condition of operation, and means to actuate said device to said one condition of operation when said actuating means is deenergized.

15. A self-balancing measuring and control apparatus combination comprising a normally balanced circuit network, means unbalancing said network on a change in the value of a quantity measured, a reversible motor operable to rebalance said circuit when unbalanced, an amplifier including an input circuit and an output circuit and electronic valve amplifying means connected between said input and output circuits, said motor having a control winding connected to said output circuit, amplifier energizing means for supplying alternating current of a relatively low frequency to said amplifier, means impressing on said input circuit a signal which is of said relatively low frequency and varies in magnitude in predetermined proportion to the extent of network unbalance and is dependent in phase on the direction of network unbalance, circuit means coupling said input and output circuits to transfer energy from said output circuit to said input circuit and thereby superimpose a relatively high frequency signal on the relatively low frequency signal impressed on said input circuit, predetermined variations in the condition of operation of said apparatus being operative to cause the appearance of or disappearance of the relatively high frequency signal in the output circuit of said amplifier, and high frequency signal detecting means connected to the output circuit of said amplifier.

16. A self-balancing measuring and control apparatus combination comprising a normally balanced circuit network, means unbalancing said network on a change in the value of a quantity measured, a reversible motor operable to rebalance said circuit when unbalanced, an amplifier including an input circuit and an output circuit and electronic valve amplifying means connected between said input and output circuits, said motor having a control winding connected to said output circuit, amplifier energizing means for supplying alternating current of a relatively low frequency to said amplifier, means impressing on said input circuit a signal which is of said relatively low frequency and various in magnitude in predetermined proportion to the extent of network unbalance and is dependent in phase on the direction of network unbalance, circuit means coupling said input and output circuits to transfer energy from said output circuit to said input circuit and thereby superimpose a relatively high frequency signal on the relatively low frequency signal impressed on said input circuit, predetermined variations in the condition of operation of said apparatus being operative to cause the appearance of or disappearance of the relatively high frequency signal in the output circuit of said amplifier, high frequency signal detecting means connected to the output circuit of said amplifier and means actuated by said detecting means to subject said motor to a braking action when the relatively high frequency signal appears in said output circuit.

17. A combination as specified in claim 16, including means cooperating with said high frequency signal detecting means to render said braking action only momentary in effect.

18. A self-balancing measuring and control apparatus combination comprising a normally balanced circuit network, means unbalancing said network on a change in the value of a quantity measured, means operable to rebalance said circuit when unbalanced, an amplifier including an input circuit and an output circuit, said rebalancing means having a control connection to said output circuit, means impressing on said input circuit a signal which is of relatively low frequency, and circuit means coupling said input and output circuits to transfer energy from said output circuit to said input circuit and thereby superimpose a relatively high frequency signal on the relatively low frequency signal impressed on said input circuit, predetermined variations in the condition of operation of said apparatus being operative to cause the appearance of or disappearance of the relatively high frequency signal in the output circuit of said amplifier.

19. A self-balancing measuring and control apparatus combination comprising a normally balanced circuit network, means unbalancing said network on a change in the value of a quantity measured, means operable to rebalance said circuit when unbalanced, an amplifier including an input circuit and an output circuit, said rebalancing means having a control connection to said output circuit, means impressing on said input circuit a signal which is of relatively low frequency, circuit means coupling said input and output circuits to transfer energy from said output circuit to said input circuit and thereby superimpose a relatively high frequency signal on the relatively low frequency signal impressed on said input circuit, predetermined variations in the condition of operation of said apparatus being operative to cause the appearance of or disappearance of the relatively high frequency signal in the output circuit of said amplifier, and high frequency signal detecting means connected to the output circuit of said amplifier.

20. A self-balancing measuring and control apparatus combination comprising a normally balanced circuit network, means unbalancing said network on a change in the value of a quantity measured, a reversible motor operable to rebalance said circuit when unbalanced, an amplifier including an input circuit and an output circuit and electronic valve amplifying means connected between said input and output circuits, said motor having a control winding connected to said output circuit, amplifier energizing means for supplying alternating current of a relatively low frequency to said amplifier, means impressing on said input circuit a signal which is of said relatively low frequency and various in magnitude in predetermined proportion to the extent of network unbalance and is dependent in phase on the direction of network unbalance, and circuit means coupling said input and output circuits to transfer energy from said output circuit to said input circuit and thereby superimpose a relatively high frequency signal on the relatively low frequency signal impressed on said input circuit, the predetermined proportion of the magnitude of the relatively low frequency signal to the extent on the network unbalance being such that predetermined variations in the condition of operation of said apparatus will cause the relatively low frequency signal to vary between a value at which the relatively high frequency signal appears in the output circuit and a value at which that signal is clipped or cut off in said amplifier.

21. A self-balancing measuring and control apparatus combination comprising a normally balanced circuit network, means unbalancing said network on a change in the value of a quantity measured, a reversible motor operable to rebalance said circuit when unbalanced, an amplifier including an input circuit and an output circuit and electronic valve amplifying means connected between said input and output circuits, said motor having a control winding connected to said output circuit, amplifier energizing means for supplying alternating current of a relatively low frequency to said amplifier, means impressing on said input circuit a signal which is of said relatively low frequency and varies in magnitude in predetermined proportion to the extent of network unbalance and is dependent in phase on the direction of network unbalance, and circuit means coupling said input and output circuits to transfer energy from said output circuit to said input circuit and thereby superimpose a relatively high frequency signal on the relatively low frequency signal impressed on said input circuit, the frequency of oscillation of the relatively high frequency signal being selected in the frequency range in which the gain of said amplifier is appreciably lower than it is for the normal operating frequency range including the relatively low frequency signal and the lower harmonics thereof, the predetermined proportion of the magnitude of the relatively low frequency signal to the extent of network unbalance being such that predetermined variations in the condition of operation of said apparatus will cause the relatively low frequency signal to vary between a value at which the relatively high frequency signal appears in the output circuit and a value at which that signal is clipped or cut off in said amplifier.

22. A combination as specified in claim 20, in which the voltage of a source of D. C. voltage is the quantity measured and in which conversion apparatus is connected in a branch of said network with said source to convert unidirectional current flow in said branch into the relatively low frequency signal impressed on said input circuit.

23. A combination as specified in claim 20, in which the voltage of a source of D. C. voltage is the quantity measured and in which conversion apparatus is connected in a branch of said network with said source to convert unidirectional current flow in said branch into the relatively low frequency signal impressed on said input circuit, and in which the circuit coupling means is connected to said input circuit through said branch.

24. A combination as specified in claim 20, in which the voltage of a source of D. C. voltage is the quantity measured and in which conversion apparatus is connected in a branch of said network with said source to convert unidirectional current flow in said branch into the relatively low frequency signal impressed on said input circuit, and in which said circuit coupling means couples the output circuit to the input circuit at the output side of said conversion apparatus.

25. A combination as specified in claim 20, in which the combination elements are arranged and proportioned to maintain such signal current amplitudes that the relatively high frequency signal appears in said output circuit only when said circuit network is in or near its balanced condition, and in which said combination includes means for detecting the appearance of the relatively high frequency signal in said output circuit.

26. A combination as specified in claim 20, in which the combination elements are arranged and proportioned to maintain such signal current amplitudes that the relatively high frequency signal appears in said output circuit only when said bridge circuit is in or near its balanced condition and in which said combination includes high frequency signal detecting means, and means actuated thereby to subject said motor to a braking action when the relatively high frequency signal appears in said output circuit.

27. A combination as specified in claim 20, in which the combination elements are arranged and proportioned to maintain such signal current amplitudes that the relatively high frequency signal appears in said output circuit only when said circuit network is in or near its balanced condition and in which said combination includes high frequency signal detecting means, and means actuated thereby to supply degenerative voltage to said amplifier on the appearance of the relatively high frequency signal in said output circuit.

28. A combination as specified in claim 20, in which the combination elements are proportioned and arranged to maintain such signal current amplitudes that the relatively high frequency signal appears in said output circuit only when said circuit network is in or near its balanced condition and in which said combination includes an intermittently operating recording device, high frequency signal detecting means, and means actuated by said detecting means to operate said recording device on the appearance of the relatively high frequency signal in said output circuit.

29. A combination as specified in claim 20, in which the combination elements are proportioned and arranged to maintain such signal current amplitudes that the relatively high frequency signal appears in said output circuit only when said circuit network is in or near its balanced condition, and in which said combination includes a selector switch intermittently operable to successively connect a plurality of voltage sources one at a time in regular order to said circuit network, high frequency signal detecting means, and means actuated by said detecting means to operate said selector switch when the relatively high frequency signal appears in said output circuit.

30. A combination as specified in claim 20, in which the combination elements are proportioned and arranged to maintain such signal current amplitudes that the relatively high frequency signal appears in said output circuit only when said circuit network is in or near its balanced condition and in which said combination includes a relay including a relay member movable between two positions and normally maintained in one of said positions, high frequency signal detecting means, relay control means including actuating means energized by said detecting means to move said relay member into its second position when the relatively high frequency signal appears in said output circuit, means for deenergizing said actuating means after said member is moved into its second position, and means for returning said member to said one position when said actuating means is deenergized.

31. Self-balancing potentiometric measuring and control apparatus of the type comprising a bridge circuit including a slide wire resistance, a slider contact adjustable along said resistance, a circuit branch including a source of variable unidirectional voltage between said contact and a point in said bridge circuit at a potential differing from the potential of said contact by an amount which, when the bridge circuit is balanced, is equal to and opposite to said voltage, a reversible motor for adjusting said contact to rebalance said circuit when unbalanced by variation in said voltage, an amplifier including an input circuit and an output circuit and electronic valve amplifying means connected between said input and output circuits, amplifier energizing means supplying alternating current of a relatively low frequency to said amplifier, and a converter connected to said source and impressing on said input circuit a signal which is of said relatively low frequency and is of a magnitude in predetermined proportion to the difference between said voltage and said difference and is dependent in phase on whether said voltage exceeds or is smaller than said potential difference, and in combination with said apparatus, means coupling said input and output circuits to transfer energy from said output circuit to said input circuit and thereby superimpose a relatively high frequency signal on the relatively low frequency signal impressed on said input circuit, the predetermined proportion of the magnitude of the relatively low frequency signal to the extent of network unbalance being such that predetermined variations in the condition of operation of said apparatus will cause the relatively low frequency signal to vary between a value at which the relatively high frequency signal appears in the output circuit and a value at which that signal is clipped or cut off in said amplifier.

RUDOLF F. WILD.

REFERENCES CITED

The following references are of record in the file of this patent:

UNITED STATES PATENTS

| Number | Name | Date |
| --- | --- | --- |
| 2,124,684 | Behr et al. | June 26, 1938 |
| 2,209,369 | Wills | July 30, 1940 |
| 2,352,103 | Jones et al. | June 20, 1944 |
| 2,376,527 | Wills | May 22, 1945 |